United States Patent
Santos et al.

(10) Patent No.: US 11,274,214 B2
(45) Date of Patent: Mar. 15, 2022

(54) COMPOSITION OF WATER BASED COATING WITH A LOW CONTENT OF VOLATILE ORGANIC COMPOUNDS AND HIGH RESISTANCE TO DIRT HANDLE, AND, USE OF WATER BASED COATING

(71) Applicant: OXITENO S.A. INDÚSTRIA E COMÉRCIO, São Paulo (BR)

(72) Inventors: Juliane Pereira Santos, Mauá (BR); Carlos Roberto Tomassini, Mauá (BR); Érica Regina Buratini, Mauá (BR); Robson Andre Pagani, Mauá (BR); Carlos Henrique Salvador, Mauá (BR); Raquel da Silva, Mauá (BR); Silmar Balsamo Barrios, Mauá (BR)

(73) Assignee: OXITENO S.A. INDÚSTRIA E COMÉRCIO, Sao Paulo (BR)

(*) Notice: Subject to any disclaimer, the term of this patent is extended or adjusted under 35 U.S.C. 154(b) by 0 days.

(21) Appl. No.: 16/481,720

(22) PCT Filed: Jan. 5, 2018

(86) PCT No.: PCT/BR2018/050002
§ 371 (c)(1),
(2) Date: Jul. 29, 2019

(87) PCT Pub. No.: WO2018/137013
PCT Pub. Date: Aug. 2, 2018

(65) Prior Publication Data
US 2020/0002547 A1  Jan. 2, 2020

(30) Foreign Application Priority Data

Jan. 30, 2017 (BR) .................. BR1020170018849

(51) Int. Cl.
*C09D 5/02* (2006.01)
*C08K 5/05* (2006.01)
(Continued)

(52) U.S. Cl.
CPC ................ *C09D 5/024* (2013.01); *C08K 5/05* (2013.01); *C08K 5/092* (2013.01); *C09D 157/00* (2013.01); *C09D 167/00* (2013.01); *C09D 187/00* (2013.01)

(58) Field of Classification Search
CPC ....................................................... C08K 5/05
See application file for complete search history.

(56) References Cited

U.S. PATENT DOCUMENTS

| 3,399,158 A | 8/1968 | Huitson |
| 9,120,936 B2 | 9/2015 | Hibben et al. |

(Continued)

FOREIGN PATENT DOCUMENTS

MX    2012013639    2/2013

OTHER PUBLICATIONS

Orgal Product Data Sheet obtained Nov. 12, 2020 at https://www.organikkimya.com/_files/bufile/e936f97e-072e-4ea6-9323-753cd4f8a89b.pdf.*

(Continued)

*Primary Examiner* — Arrie L Reuther
(74) *Attorney, Agent, or Firm* — Wenderoth, Lind & Ponack, L.L.P.

(57) ABSTRACT

The present invention relates to water-based coatings compositions containing low volatiles and high resistance to the dirt grip. Such compositions contain conventional low VOC coalescing latexes which favor the evolution of hardness of films of inks and films of polymers by providing coatings with high resistance to the catch of dirt that can be used in various applications. Such coalescents are predominantly (Continued)

diesters with a boiling point greater than 260° C., preferably boiling point greater than 280° C., and molecular weight between 230 and 342 atomic mass units prepared from diacid and alcohol or monoacid reactions and diols.

19 Claims, 9 Drawing Sheets

(51) Int. Cl.
*C08K 5/092* (2006.01)
*C09D 157/00* (2006.01)
*C09D 167/00* (2006.01)
*C09D 187/00* (2006.01)

(56) References Cited

U.S. PATENT DOCUMENTS

| | | |
|---|---|---|
| 2009/0149591 A1 | 6/2009 | Yang et al. |
| 2009/0194003 A1 | 8/2009 | Zhou et al. |
| 2009/0198002 A1 | 8/2009 | Zhou et al. |
| 2012/0164467 A1 | 6/2012 | Sobczak |
| 2013/0324770 A1* | 12/2013 | Schaub .................. C07C 29/34 568/902 |
| 2014/0243446 A1 | 8/2014 | Turk et al. |

OTHER PUBLICATIONS

International Search Report dated Apr. 2, 2018 in International (PCT) Application No. PCT/BR2018/050002.
Extended European Search Report dated Dec. 18, 2020 in corresponding European Patent Application No. 18744741.2.

\* cited by examiner

COMPOSITION OF WATER BASED COATING WITH A LOW CONTENT OF VOLATILE ORGANIC COMPOUNDS AND HIGH RESISTANCE TO DIRT HANDLE, AND, USE OF WATER BASED COATING

FIELD OF THE INVENTION

The present invention relates to waterborne coating compositions with high resistance to dirt grip containing coalescents with low content of volatile organic compounds and excellent plastification efficiency.

BACKGROUND OF THE INVENTION

The development of water-based coatings technology has been the focus of long-term research. The first industrial scale coatings that excluded the use of organic solvents from their composition appeared in the mid-twentieth century. Nowadays, most of the architectural projects already use the technology of water-based coatings.

Most water-based coatings contain acrylic and vinyl latexes obtained by emulsion polymerization and require a low solvent content, also known as a coalescing agent or coalescer, to form continuous films under various temperature and humidity conditions yielding coatings with gloss and mechanical properties suitable for each application.

The agents or coalescing agents need to be efficient to plasticize the polymer particles present in the latexes without destabilizing them, and still need to be compatible with the other ingredients present in the water-based coating formulations.

Currently, there is a growing demand for coalescing agents that are not considered Volatile Organic Compounds (VOCs) in accordance with environmental regulations that control the volatile organic compound content in coatings formulations. Coalescing agents with low amount of VOC exhibit a boiling point greater than 250° C. according to the European Directive 2004/42/CE and boiling point greater than 280° C. for the Green Seal Standard. For the US Environmental Protection Agency, low VOC coalescents have negligible photochemical reactivity or do not emit volatiles, except water, when subjected to a temperature of 110° C. for 1 hour according to Method 24. Typically, these coalescents have a boiling point equal to or greater than 344° C.

Increasing the boiling point reduces the volatility of the coalescents and hence the emissions to the atmosphere which is desirable from the environmental point of view by not polluting the environment with vapors that favor the formation of tropospheric ozone. However, these coalescents, by evaporating more slowly, can keep the films of coatings or polymers permanently plasticized and with low hardness. This permanent decrease in the hardness of the films of coatings or polymer coatings greatly increases their tackiness, favoring the increase of adhesion between coated surfaces (thereby reducing their resistance to blocking) and increasing adhesion of dirt to painted surfaces (thereby resistance to dirt). These two undesirable effects diminish the performance and durability of inks, especially coatings applied to outdoor surfaces such as decorative paints and industrial paints.

Consequently, there is a very relevant demand for coalescents that have low VOCs and are concomitantly more efficient at lowering the minimum film forming temperature (TMFF) and improving the final properties of the paints. Among these properties, washability and resistance to dirt grip are noteworthy.

The efficiency of a coalescer depends on the affinity between coalescent and polymers present in pure latexes and compositions of coatings formulated with such latexes. When interacting with the polymer chains present in the latex particles, increase the mobility of the polymer chains favoring:

1) The deformation and packaging of the latex particles and the formation of latex films without holes, continuous and transparent under various conditions of temperature and humidity;
2) The interdiffusion of the polymer chains from one particle to another, an event reported in the literature as coalescence, and the entanglement of the polymer chains responsible for the mechanical resistance of the film;
3) The leveling of the film that is related to its brightness and appearance is promoted, according to the literature, predominantly by the balance between the interfacial tension polymer-air that favors the leveling of the surface of the film with the objective of reducing the surface area and the internal resistance of the polymer chains to the movement related to the glass transition temperature (Tg) of the polymer.
4) The distribution of hydrophilic and hydrophobic species in the film that can impact the gloss, water resistance and washability of polymer films, adhesives and paint films.

In addition to the above features, the low coalescing VOCs, due to the fact they are, at least partially, retained in the films as mentioned above, can be homogeneously distributed throughout the film, predominantly migrate to the interfaces, or distribute within the film and partially migrate to the interfaces. Each distribution pattern affects the hardness of the film. Thus, it is expected that some low volatility coalescents molecules will have a distribution pattern in the films of water-based coatings that allows the evolution of hardness. Therefore, molecules that have this behavior are potential solutions to mitigate the problem of high dirt grip or low dirt grip resistance observed for formulations of water-based coatings containing commercially available low VOC coalescers.

Another solution to mitigate the problem of high dirt grip in water-based coatings formulated with low VOC coalescents is to use low VOC coalescents which are more efficient to form film, and which can be used in a lower concentration.

A potential solution for improving the high dirt grip problem of water-based coatings containing low VOC coalescents is described in U.S. Pat. No. 9,120,936 B2. In this invention coating compositions containing conventional low VOC coalescents and antioxidants have been shown to increase dirt grip strength by up to 70%.

The Mexican patent application MX 2012013639 A proposes the use of coalescents containing amide functional group to mitigate the problem of high dirt grip.

Most of the low VOC coalesces with a boiling point above 280° C. on the market are diesters. Previous lab work has shown that market diesters have excellent plastification potential. However, these coalescents usually are retained at least partially in the coating film, preventing the hardness evolution of the coating films and decreasing their resistance to the dirt grip.

SUMMARY OF THE INVENTION

The present invention comprises low VOC coalescents with excellent Tg plastification efficiency of less than 55° C. present in water-based coating compositions.

The coalescents of the present invention are dotted diesters of boiling point greater than 260° C., preferably greater than 280° C., and are therefore considered low VOC coalescents.

Surprisingly, the coating compositions containing the low VOC coalescents exhibit good hardness evolution and generate paints with high tack resistance and high blocking resistance overcoming a limitation of low VOC water-based coatings.

DETAILED DESCRIPTION OF THE INVENTION

Figure 1:
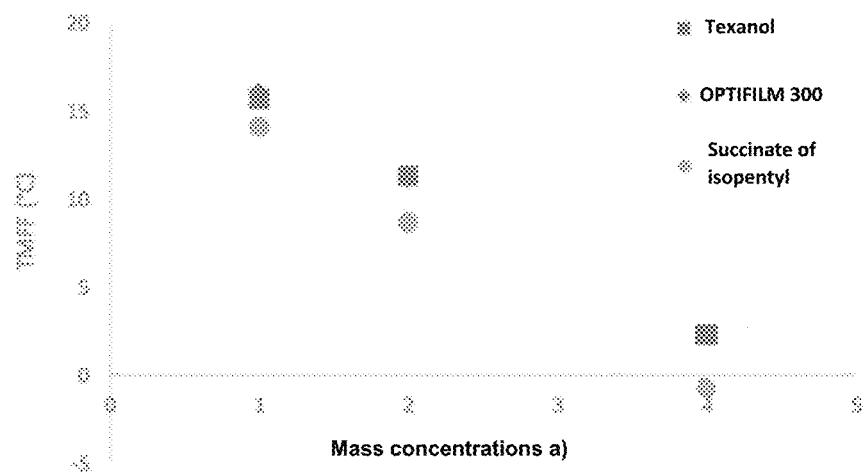
FIG. 1 shows the effect of the concentration of different coalescents on TMFF of styrene-acrylic latex with TMFF of 22° C.

The present invention comprises compositions of water-based coatings containing low VOC coalescents which exhibit good hardness evaluation and high resistance to dirt grip.

In this invention, the term "coalescents or coalescing agents" refers to solvents capable of acting as plasticizer of the polymer phase present in the water-based coating compositions.

Water-based coating compositions understood in the present invention require a coalescer or coalescing mixture to decrease the TMFF (Minimum Film Forming Temperature) of the polymer phase and allow the formation of film under various conditions of temperature and humidity.

The coalescents comprised in the present invention exhibit excellent plastification efficiency, in addition to being at least partially retained in the coating films because of their low volatility. However, they surprisingly allow the hardness of the coating films to evolve as a function of air drying and aging of the film, favoring increased resistance to the dirt grip.

The low VOC and high dirt grip water-based coating compositions comprised in the present invention contain at least:

1) Dispersions of polymers in water or latex (singular) or latex (plural) or polymer in solution, the polymers having Tg of less than 55° C., preferably less than 40° C.; and
2) Coalescents with general structure $$R1\text{-}B\text{-}A\text{-}B\text{—}R2 \qquad \text{(General structure I)}$$

where:
R1 and R2 may be the same or different, wherein R1 and R2 are C5-C7 or C5-C7 alkoxylated derivatives
B is O—C=O where the carbon of the ester group is bonded to the carbon of group A, wherein A is equal to $(CH_2)_n$ where n=1 to 8 or A comprises 1 to 8 carbons with a maximum an establishment.

The coalescents with structure R1-B-A-B—R2 have molecular weight greater than 230 units of atomic mass and less than 342 units of atomic mass.

In addition, these agents have a boiling point greater than 260° C., preferably greater than 280° C.

The coalescents comprised in the present invention are preferably diesters derived from diacid or anhydride reactions of diacids with conventional or alkoxylated alcohols.

The coalescing agents comprised in the present invention are substances which may comprise various esters from the reaction process always using only one type of diacid, preferably succinic acid.

The succinic acid may be of a fossil or renewable source, wherein the succinic acid from a renewable source is derived from biotechnological processing of biomass being able to be first generation or second generation, preferably first generation.

In one embodiment, the diesters comprised in the present invention are derived from the esterification reaction of succinic acid and C5 alcohol, preferably from fusel oil.

The C5 alcohol from the fusel oil has 75-80% by mass of 3-methylbutanol and 20-25% by weight of 2-methylbutanol, preferably the C5 alcohol has 80% by weight of 3-methyl-butanol and 20% by weight of 2-methyl-butanol.

Preferably, the coalescing agents comprised in the present invention comprise predominantly 3-methylbutanol succinate or isopentyl succinate.

The coalescents comprised in the present invention have a diester content of greater than 80%, preferably greater than 95%.

More specifically, the coalescing agents according to the present invention promote an improvement in the hardness evolution of water-based low VOC coatings due to the synergistic combination of the general structure substances I and latexes used in water-based coatings, especially latexes used in decorative paints and industrial paints having Tg of less than 55° C., preferably less than 40° C.

The low VOC and high tack strength water-based coating compositions according to the present invention utilize polymer dispersions or latexes having various monomeric compositions, especially styrene-butyl acrylate, styrene-butyl acrylate, styrene-butadiene-acrylic acid, styrene-butadiene-methacrylic acid, acrylonitrile-butadiene, acrylonitrile-butadiene-acrylic acid, acrylonitrile-butadiene-methacrylic acid, polyacrylates, polyacrylates-acrylic acid, polyacrylates-methacrylic acid, polyacrylates-carboxylic acids, vinyl acetate-acrylate butyl acrylate carboxylic acid derivatives, vinyl ethylene acetate, polyvinyl acetate, alkyds, epoxy resin derivatives, polyester, polyurethane, melanin-polyurethane and/or mixtures of the aforementioned latex.

In a preferred embodiment of the composition according to the present invention, the concentration of the coalescents may range from 0.1-50% relative to the polymer content present in the coating formulations, specifically between 0.5-35% and more preferably between 1-12%.

Mixtures between the coalescents comprised in the present invention and other potential coalescents may be used to improve the performance or cost properties of formulations of water-based coatings with a low VOC content and high resistance to the dirt grip.

The low VOC and high resistant dirt grip water-based coating compositions according to the present invention may be used in decorative paints, industrial paints, printing inks, toner, original automotive paints, repainting paints, adhesives, sealants, waterproofing agents, gloves and carpets, among others.

The following are examples which demonstrate the potential of the compositions of the present invention to produce paints and coatings with high dirt grip strength and excellent washability.

The high resistance to dirt grip of the paint compositions coatings can be evidenced from the results of hardness evolution, blocking resistance and delta E of internal methodology developed to evaluate the resistance to dirt grip, while the verification of the high plastification efficiency can be evidenced from the results of TMFF, atomic force microscopy of the systems containing polymers and coalescents, and washability of the paint formulations. The examples which will be presented illustrate the potential of the compositions according to the present invention.

EXAMPLES

Example 1: Synthesis of Ester Derived from Succinic Acid

The process of the synthesis of isopentyl succinate consisted of loading 333.33 g (7 moles) of succinic acid powder into the reactor followed by 646.6 g (21 moles) of C5 alcohol from the fusel oil containing 80% of 3-methylbutanol and 20% of 2-methylbutanol, 2.0 g (0.02 mol) of methane sulfonic acid and 3.2 g (0.05 mol) of hypophosphorous acid as the catalyst. The process was conducted at 95-100° C., the C5 alcohol azeotrope was distilled off and water, and then the reaction temperature was heated to 125° C. to achieve acid value contents of less than 5 mg KOH/g. In this condition, the application of vacuum, for distillation of the excess alcohol C5, at temperatures of 135° C., until the acid content of less than 3 mg KOH/g is started. Subsequently, the reaction mass was neutralized with 15% sodium carbonate to remove the acid catalysts. The reaction mass is then washed 2 to 3 times with water, removing the residual soap and then subjected to vacuum drying at 100° C. to remove residual water. At the end, the product is filtered to remove the sodium salt and packaged. It is possible to optimize the process to maximize product productivity.

The C5 alcohol used in the synthesis of isopentyl succinate comes from the fusel oil and has 75-80% of 3-methylbutanol and 20-25% of 2-methyl-butanol, preferably 80% 3-methyl-butanol or isopentanol and 20% 2-methyl-butanol. Depending on the predominance of isopentyl succinate in the product of this synthesis, the product obtained will be called simplicity of isopentyl succinate.

Example 2: Composition of Isopentyl Succinate

The composition of the product obtained by chromatography gas is shown in Table 1.

TABLE 1

Composition of the product obtained in Example 1.

| Components | Content (%) |
|---|---|
| Isopentyl succinate | 95.76 |
| Alcohol C5 | 0.76 |
| Other esters | 3.34 |
| Water | 0.14 |
| Total | 100.00 |

Example 3: Physical-Chemical Properties of the Isopentyl Succinate Obtained in Example 1

The physicochemical properties of isopentyl succinate are presented in Table 2.

TABLE 2

Physical and chemical properties of isopentyl succinate.

| Properties | Values |
|---|---|
| Boiling point (° C.) | 282 |
| Relative evaporation rate (%) | 0.029 |
| Volatile content (%) according to method 24 | 50 |
| Density (g/ml) | 0.966 |
| Freezing point (° C.) | −25 |
| Flash point (° C.) | 122.6° C. |
| Smell | Low |

The results presented in Table 2 demonstrate that isopentyl succinate has low volatility, relatively low freezing temperature and is not considered flammable and can be employed in various formulations of low VOC water-based coatings.

Example 4: Hansen Solubility Parameters Estimated for Isopentyl Succinate

The Hansen solubility parameters of isopentyl succinate and coalescing agents commonly used in the market are shown Table 3.

In order to perform the comparative tests, two commercially available products, Texanol™ and OPTIFILM 300™, were used. All coalescents have a high dispersive component which is related to the hydrophobicity of the molecules. Isopentyl succinate has an intermediate polarity between Texanol™ and OPTIFILM 300™ and the ability to form hydrogen bonds with water molecules similar to Texanol™.

TABLE 3

Parameters of solubility of coalescents and coalescent in the present invention, isopentyl succinate.

| Parameters | Texanol | OPTIFILM300 ™ | Isopentyl Succinate |
|---|---|---|---|
| Dispersive component $(J/cm^3)^{1/2}$ | 15.1 | 15.6 | 15.8 |
| Polar component $(J/cm3)$ ½ | 6.1 | 2.1 | 3.4 |
| Hydrogen bridges $(J/cm3)^{1/2}$ | 9.8 | 2.6 | 9.3 |
| Coefficient of octanol/water partition | 3.11 | 4.87 | 3.98 |

The octanol/water partition coefficients suggest that isopentyl succinate and evaluated market coalescents have low solubility in water.

Previous work has suggested that coalescents with low solubility in water, low volatility and suitable polarity to plasticize the polymer phases present in latexes are more effective than coalescents with high solubility in water and volatility due to the higher coalescing content present in the polymer phase during the formation of film. Another negative point for more water soluble coalescents is their partial absorption with water in porous substrates, resulting in a lower concentration of coalescent in the polymer phase.

Example 5: Evaluation of the Plasticizing Efficiency of the Coalescents Comprised in the Present Invention The plastification efficiency of coalescents is usually monitored by the effect of the coalescent concentration on the minimum film formation temperature (MFFT) of latexes used in paint formulations. Acrylic latex is widely used in paint formulations. As a result, the plastification efficiency of isopentyl succinate and market coalescents in a styrene-acrylic latex with TMFF at around 20° C. was evaluated.

The effect of the concentration of isopentyl succinate and market coalescents on MFFT of a styrene-acrylic latex market, Acronal BS 700®, is shown in FIG. 1. The MFFT of the pure latex is 22° C. It is possible to verify that in the three concentrations tested (1%, 2% and 4%), the use of isopentyl succinate resulted in lower MFFT compared to the other coalescing agents.

Figure 2:
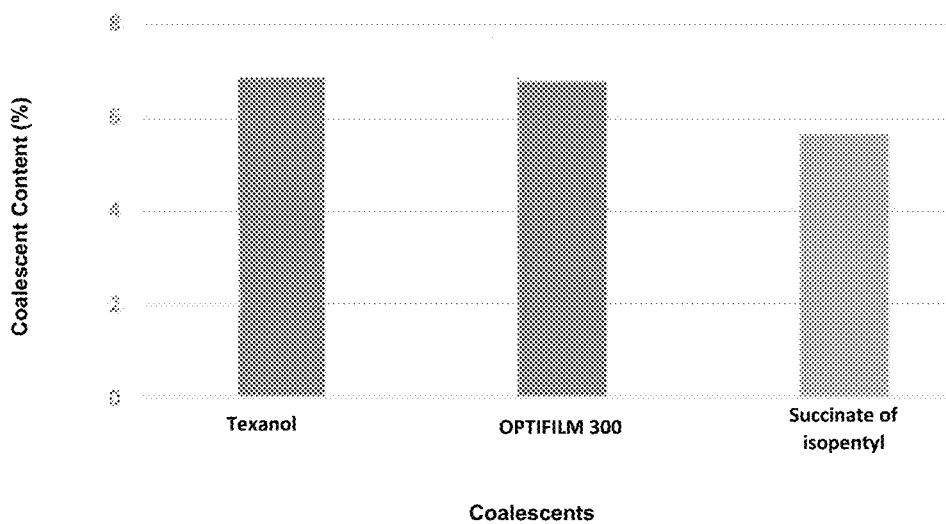
FIG. 2 demonstrates the estimated coalescing with respect to the polymer to form styrene-acrylic latex film at 5° C.

Coalescent contents estimated to form styrene-acrylic latex film at 5° C. are shown in FIG. 2. FIG. 2 demonstrates that isopentyl succinate can be used in a concentration 20% lower than the market coalescents exhibiting a higher plastification efficiency.

Figure 3:
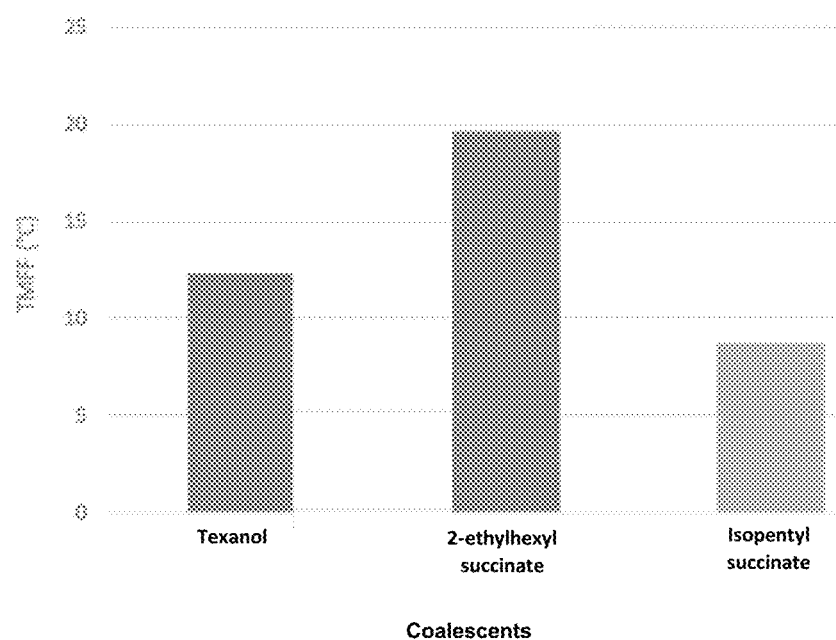
FIG. 3 shows a graph of the TMFF of styrene-acrylic latex containing 2% of different coalescents.

The plastification efficiency of isopentyl succinate was also compared to the coalescer derived from 2-ethylhexyl succinate object of protection in U.S. patent application 2014/0243446 A1. The graph shown in FIG. 3 shows the effect of a fixed concentration of 2% of different coalescents on TMFF of Acronal BS 700® latex. The TMFF data indicate that isopentyl succinate promotes a much more pronounced decrease of TMFF compared to the 2-ethylhexyl succinate claimed in US 2014/0243446 A1.

Table 4 compiles MFFT delta values promoted by 1% of coalescer relative to the polymer. These MFFT deltas are also related to the plastification efficiency of the coalescents evaluated in the present invention and were estimated according to the formula proposed in Touissant's article (Touissant, A., Wilde, M. De; Molenaar, F., Mulvihill, J. Progress in Organic Coatings 1997, 30, 179).

TABLE 4

MFFT deltas estimated for TEXANOL ®, OPTIFILM300 ®, 2-ethylhexyl succinate according to the patent application US 2014/0243446 A1 and isopentyl succinate according to the present invention.

| Coalescents | MFFT Delta (° C.) |
|---|---|
| Texanol | 2.4 |
| OPTIFILM 300 | 2.4 |
| 2-ethylhexyl succinate | 0.6 |
| Isopentyl succinate | 3.1 |

The results in Table 4 prove that the coalescer according to the present invention has plasticizing efficiency superior to the coalescing and coalescing claimed in US 2014/0243446 A1, as it provides a larger MFFT delta than the others.

The results of FIGS. 1, 2, 3 and Table 4 demonstrate that the coalescer of the present invention has a high affinity plastification efficiency allowing the particles to pack and deform into a continuous and transparent film.

Example 6: Acronal BS 700 Latex Atomic Force Microscopy Containing 4% of Different Coalescents An atomic force microscopy study of styrene-acrylic latex films containing 4% of the coalescents investigated in FIGS. 1 and 2, shown in FIG. 4, confirms this tendency for high plasticizing efficiency of the coalescer of the present invention.

Figure 4:
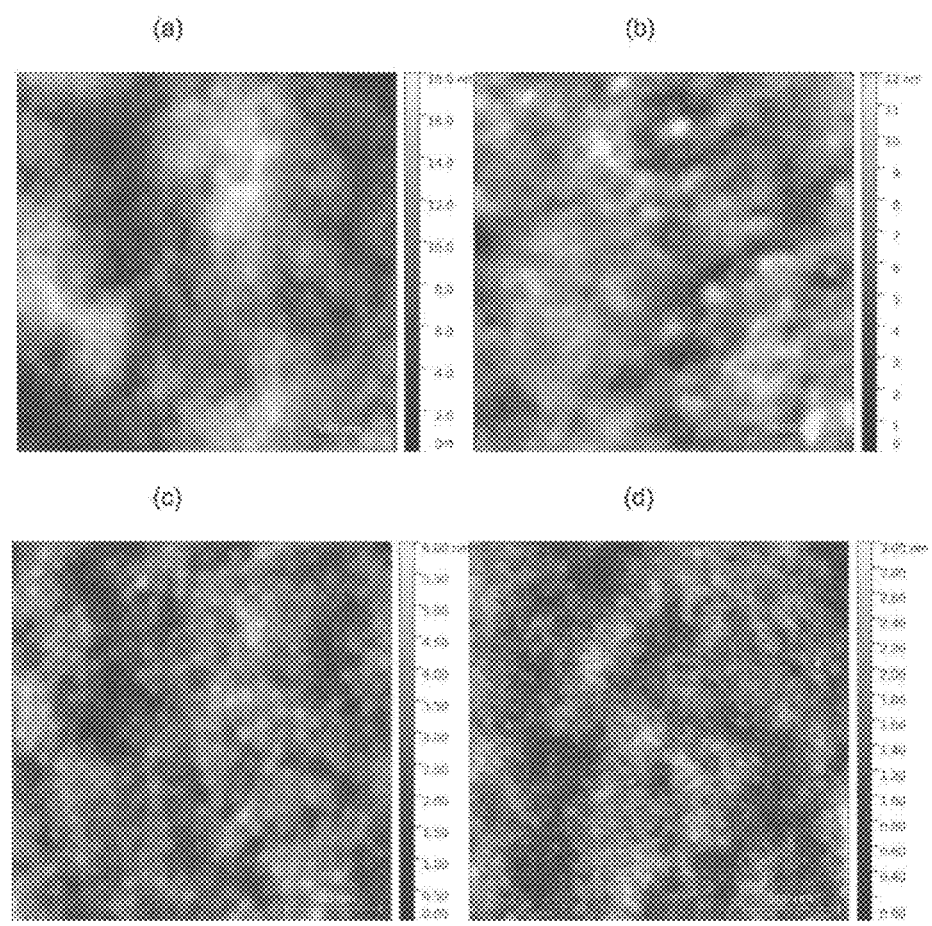
FIG. 4 shows an atomic force microscopy study of pure styrene-acrylic latex films (4a), previously investigated in FIGS. 1 and 2, and styrene-acrylic latex containing 4% of the Texanol™ coalescers (4b) and OPTIFILM 300™ (4c) and the isopentyl succinate coalescer of the present invention (4d).

In the AFM micrographs of pure styrene-acrylic latex films, FIG. 4, it is possible to identify well-packed and deformed particles. The maximum height difference in the film is about 18 nm.

In the micrographs of the styrene-acrylic latex containing 4% of the petrochemical coalescents Texanol™ and OPTIFILM 300™, FIGS. 4b and 4c respectively, it is possible to observe the presence of the boundaries of the particles suggesting that the particles are not completely coalesced.

Maximum height difference values of 12 and 6 nm obtained for the latex films containing the Texanol™ and OPTIFILM 300™ coalescers, respectively, indicate that these films are smoother than the pure latex film.

THE OPTIFILM 300™, which has a boiling point of 281° C., provides a smoother and smoother film than Texanol™ with a boiling point of 254° C., following the trend observed in the literature, by Juhué et al. (Juhué, D., Lang, J., Macromolecules 1994, 27, 695-701), that coalescents with high affinity for the polymer phase that evaporate slowly form smoother and smoother films.

The micrograph of the styrene-acrylic latex film containing 4% of the coalescing isopentyl succinate of the present invention is shown in FIG. 4d. In the micrograph shown in FIG. 4d it is not possible to identify the particle domains suggesting that they are completely coalesced. The film is very smooth and leveled, the maximum difference of heights in the film is 3 nm.

According to the AFM micrographs, the efficiency of the coalescents to coalesce the particles and generate smooth and level films follows the following trend: Isopentyl succinate>OPTIFILM 300™>Texanol™>>.

Example 7: Evolution of Styrene-Acrylic Latex Hardness Containing 8% Relative to the Polymer or 8 pcp (Parts Per Hundred of Polymer) of Different Coalescents The styrene-acrylic latex hardness evolution results containing 8 pcp of Texanol™, OPTIFILM 300™ and isopentyl succinate are shown in FIG. 5.

Figure 5:
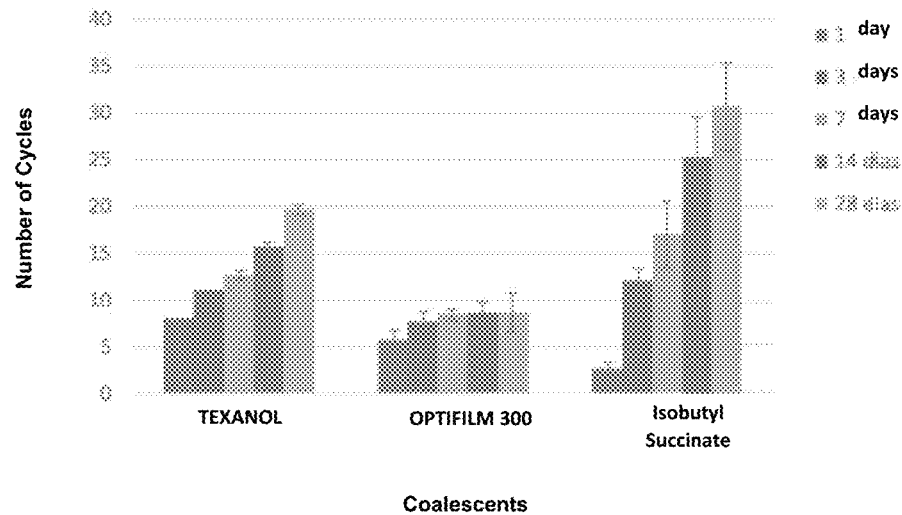
FIG. 5 shows a graph of the evolution of TMFF styrene-acrylic latex hardness of approximately 22° C. containing 8 pcp of Texanol™, OPTIFILM 300™ and isopentyl succinate.

The hardness evolution results shown in FIG. 5 indicate that isopentyl succinate has a pattern of interaction and/or distribution in the polymer which allows it to exhibit a hardness evolution. As will be demonstrated in other examples, this behavior is preserved in the paint formulations.

For drying times greater than or equal to 7 days, polymer films containing isopentyl succinate with a boiling point greater than 280° C. show a more pronounced hardness evolution than the films containing Texanol® itself, which is the reference and has a boiling point of 254° C.

On the other hand, OPTIFILM 300™, despite having a boiling point higher than 280° C., as high as isopentyl succinate, does not allow a significant evolution of the hardness with the drying time, keeping the films of polymers and plasticized inks and favoring the decrease of the resistance to blocking and the handle of dirt.

These results show that the isopentyl succinate according to the present invention has a high plasticizing efficiency and is distributed in the polymer film or paint favoring the evolution of hardness.

Example 8: Evaluation of the Coalescing Plastification Efficiency According to the Present Invention and Market Coalescents in Economical Paints Inks containing low polymer content, commonly known as economical inks, are the most challenging systems to assess the ability of the polymer to bind charge particles and pigments. Generally, in such formulations of paints it is necessary for the polymer plasticized by the coalescent to moisten the fillers and pigments present in the paints to generate films with cohesion and adhesion suitable for the application of the final paint. Accordingly, coalescing agents according to the present invention and market coalescents were evaluated in the economical ink formulation shown in Table 5.

TABLE 5

Economical paint formulations containing commercial coalescents and isopentyl succinate according to the present invention.

| COMPONENTS | Amount (%) | Amount (%) | Amount (%) |
|---|---|---|---|
| Water | 26.00% | 26.00% | 26.00% |
| Sodium nitrite | 0.10% | 0.10% | 0.10% |
| Na Tripolyphosphate | 0.15% | 0.15% | 0.15% |
| HEC | 0.20% | 0.20% | 0.20% |
| Monoethylene Glycol | 0.10% | 0.10% | 0.10% |
| Dispersants | 0.30% | 0.30% | 0.30% |
| Humectant | 0.20% | 0.20% | 0.20% |
| ANTAROL TS-709 | 0.20% | 0.20% | 0.20% |
| PROPYLENE GLYCOL | 0.00% | 0.00% | 0.00% |
| BP-507 | 0.10% | 0.10% | 0.10% |
| FBP-490 | 0.10% | 0.10% | 0.10% |
| Ti02 | 5.00% | 5.00% | 5.00% |
| Agalmatolite | 15.00% | 15.00% | 15.00% |
| Precipitated calcium carbonate | 15.00% | 15.00% | 15.00% |
| Kaolin | 12.00% | 12.00% | 12.00% |
| Natural calcium carbonate | 8.00% | 8.00% | 8.00% |
| Water | 6.35% | 6.35% | 6.35% |
| Antarol TS-709 | 0.10% | 0.10% | 0.10% |
| MEA | 0.10% | 0.10% | 0.10% |
| LATEX | 8.00% | 8.00% | 8.00% |
| Texanol ™ | 0.40% | - jr | — |
| OPTIFILM 300 ™ | — | 0.40% | ... |
| Isopentyl succinate | — | — | 0.40% |
| Water | 2.00% | 2.00% | 2.00% |
| Primal TT 935 | 0.60% | 0.60% | 0.60% |
| TOTAL | 100.00% | 100.00% | 100.00% |

In these formulations, the content of the coalescents to the polymer was maintained at 10% by mass.

Figure 6:
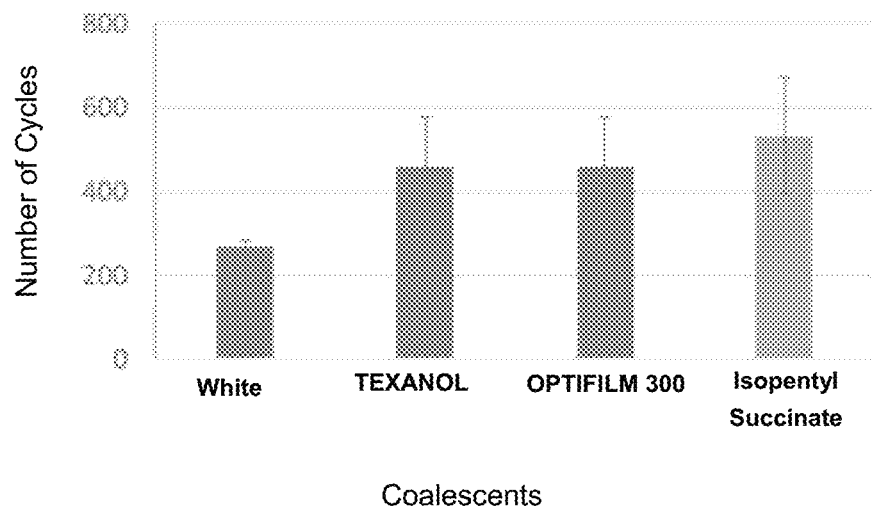
FIG. 6 shows a graph of the economical paint washability without coalescents (white) and paints containing 10 pcp of different coalescents.

FIG. 6 shows the effect of different coalescents on the washability of economical paints.

The washability results obtained for the economical inks containing the white and market coalescents confirm that the isopentyl succinate according to the present invention exhibits high plastification efficiency over the market coalescents.

Formulations of economical paints with high content of loads usually do not present problem of evolution of hardness due to the low content of polymer present in the paints.

Example 9: Evaluation of the Plastification Efficiency and Evolution of Coalescent Hardness According to the Present Invention and Market Coalescents in Premium Matte Inks Dirt grip effect is more severe for outdoor paint. Matte inks are the most commonly used outdoors and the dirt griping problem is most evident for high polymer content paints. As a result, we chose to evaluate the effect of different coalescents in the properties of premium matte inks. The matte Premium inks formulations containing the coalescent according to the present invention and commonly used coalescents are shown in Tables 6 and 7.

In this study, due to the high plastification efficiency of the coalescents mentioned in Example 5, the contents of coalescents 1.2 and 0.8% in the paint or 12% and 8% in relation to the polymer present in the paint were evaluated. Typically, in a paint formulation, the coalescing content is adjusted so that the paint film forms a film at a temperature of 5° C. Based on the MFFT results shown in FIG. 2, a content of isopentyl succinate to the polymer around 6% is sufficient to form film at 5° C. Generally, in paint formulations a slight excess of coalescence is used whereas some of the coalescer will be adsorbed in the agglomerates of loads and pigments present in the paint formulation and may be absorbed by the pores of porous substrates. For styrene-acrylic latex with TMFF around 20° C. a typical coalescent value is 10%. Accordingly, in this example, the coalescent contents relative to the polymer evaluated in the matte Premium ink formulation were 8 and 12% relative to the polymer.

TABLE 6

Matte Premium ink formulations containing 1.2% by weight of market coalescents and isopentyl succinate in inks or 12% by mass in relation to the polymer.

| Components | % mass | % mass | % mass |
|---|---|---|---|
| Drinking Water | 20.00 | 20.00 | 20.00 |
| Sodium Nitrite | 0.05 | 0.05 | 0.05 |
| Sodium Tetrapirophosphate | 0.02 | 0.02 | 0.02 |
| Hydroxyethyl cellulose | 0.25 | 0.25 | 0.25 |
| Amine | 0.05 | 0.05 | 0.05 |
| Dispersant | 0.35 | 0.35 | 0.35 |
| Humectant | 0.35 | 0.35 | 0.35 |
| Defoamer | 0.10 | 0.10 | 0.10 |
| Bactericide | 0.15 | 0.15 | 0.15 |
| Fungicide | 0.15 | 0.15 | 0.15 |
| Titanium dioxide | 15.00 | 15.00 | 15.00 |
| Kaolin - Aluminum Silicate | 4.00 | 4.00 | 4.00 |
| Natural Calcium Carbonate | 5.00 | 5.00 | 5.00 |
| Precipitated Calcium Carbonate | 8.00 | 8.00 | 8.00 |
| Agalmatolite | 4.00 | 4.00 | 4.00 |
| Subtotal | 57.47 | 57.47 | 57.47 |
| Styrene-acrylic dispersion | 20.00 | 20.00 | 20.00 |
| Defoamer | 0.15 | 0.15 | 0.15 |
| Texanol ™ | 1.20 | — | — |
| OPTIFILM 300 ™ | — | 1.20 | — |
| Isopentyl succinate | — | — | 1.20 |
| Amine | 0.15 | 0.15 | 0.15 |
| Rheology Modifier | 1.20 | 1.20 | 1.20 |
| Thickener Acrylic | 0.40 | 0.40 | 0.40 |
| Drinking water | 19.43 | 19.43 | 19.43 |
| Total | 100.00 | 100.00 | 100.00 |

TABLE 7

Premium matte formulations containing 0.8% market coalescents and isopentyl succinate in the inks or 8% in relation to the polymer.

| Components | % mass | % mass | % mass |
|---|---|---|---|
| Drinking water | 20.00 | 20.00 | 20.00 |
| Sodium Nitrite | 0.05 | 0.05 | 0.05 |
| Sodium Tetrapirophosphate | 0.02 | 0.02 | 0.02 |
| Hydroxyethyl cellulose | 0.25 | 0.25 | 0.25 |
| Amine | 0.05 | 0.05 | 0.05 |
| Dispersant | 0.35 | 0.35 | 0.35 |
| Humectant | 0.35 | 0.35 | 0.35 |
| Defoamer | 0.10 | 0.10 | 0.10 |
| Bactericide | 0.15 | 0.15 | 0.15 |
| Fungicide | 0.15 | 0.15 | 0.15 |
| Titanium dioxide | 15.00 | 15.00 | 15.00 |
| Kaolin - Aluminum Silicate | 4.00 | 4.00 | 4.00 |
| Natural Calcium Carbonate | | 5.00 | 5.00 |
| Precipitated Calcium Carbonate | 8.00 | 8.00 | 8.00 |
| Agalmatolite | 4.00 | 4.00 | 4.00 |
| Subtotal | 57.47 | 57.47 | 57.47 |
| Styrene-acrylic dispersion | 20.00 | 20.00 | 20.00 |
| Defoamer | 0.15 | 0.15 | 0.15 |
| Texanol ™ | 0.8 | — | — |
| OPTIFILM 300 ™ | — | 0.8 | — |
| Isopentyl succinate | — | — | 0.8 |
| Amine | 0.15 | 0.15 | 0.15 |
| Rheology Modifier | 1.20 | 1.20 | 1.20 |
| Thickener Acrylic | 0.40 | 0.40 | 0.40 |
| Drinking water | 19.83 | 19.83 | 19.83 |
| Total | 100.00 | 100.00 | 100.00 |

The properties of matte Premium paints with viscosity between 80-90 KU and pH 9 are shown below.

Figure 7:
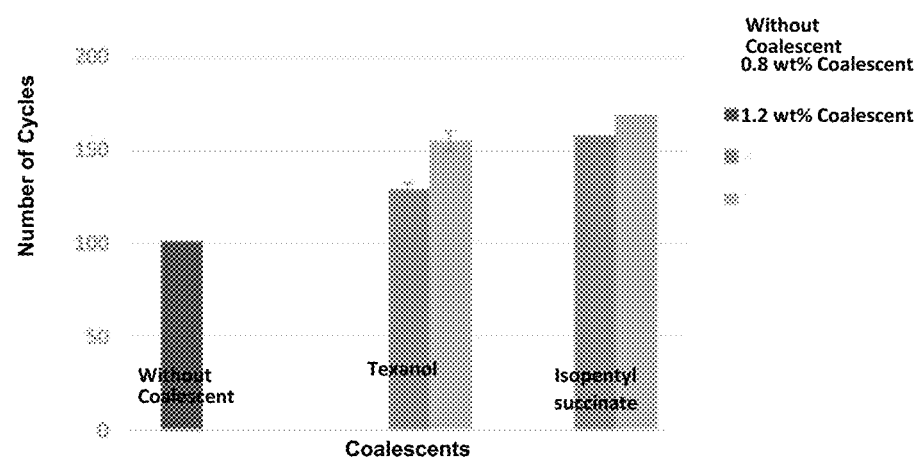
FIG. 7 shows a washability graph of Fosca Premium paint formulation containing 0.8 and 1.2% of different coalescents.

In the global market, Texanol® is recognized as the reference in the washability requirement, defined by ASTM D 2486. As a result, FIG. 7 shows the washability graph obtained for Premium matte paints containing both coalescent contents. The results the washability results of the Matte Premium inks confirm that for the two evaluated coalescent contents, isopentyl succinate provides paints with greater washability compared to Texanol®. These results are in accordance with the higher plastification efficiency observed for isopentyl succinate from the data presented in Example 5. This tendency reveals that isopentyl succinate is more efficient in favor of film formation.

Figure 8:
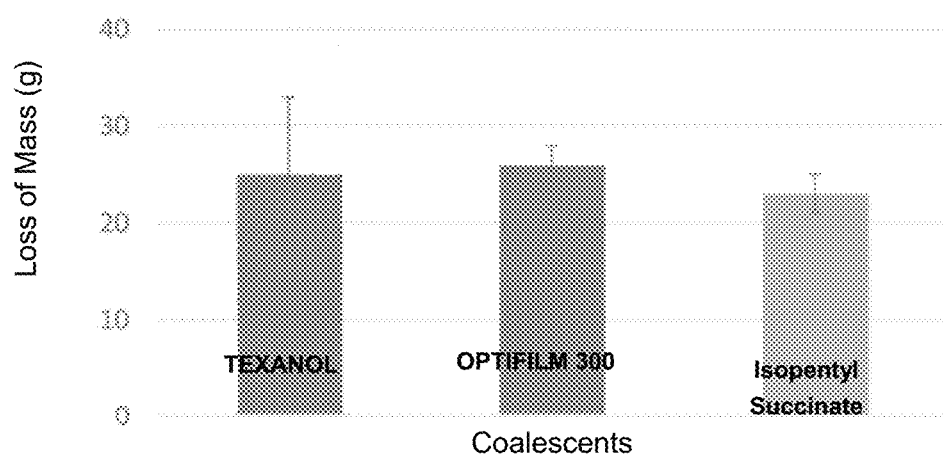
FIG. 8 shows a graph of the mass loss after 200 wash cycles according to Standard BS EN ISO 11898.

Another washability test capable of evaluating the efficiency of the coalescer of forming film, improving the cohesion and mechanical properties of the paint film, is the washability test carried out according to the European method, BS EN ISO 11898. In this case, the mass loss is determined after a fixed number of wet wash cycles is performed on an ink film of defined thickness and dried under the conditions described in BS EN ISO 11898. In Europe, the OPTIFILM 300® product is reference in the market for low VOC coalescent. FIG. 8 presents comparative evaluation of Texanol™, OPTIFILM 300™ and isopentyl succinate. Washability results confirm that succinate-containing paint films exhibit high wet abrasion resistance compared to other market coalescents.

Example 10: Evaluation of Hardness Evolution of Premium Matte Paints

Figure 9:
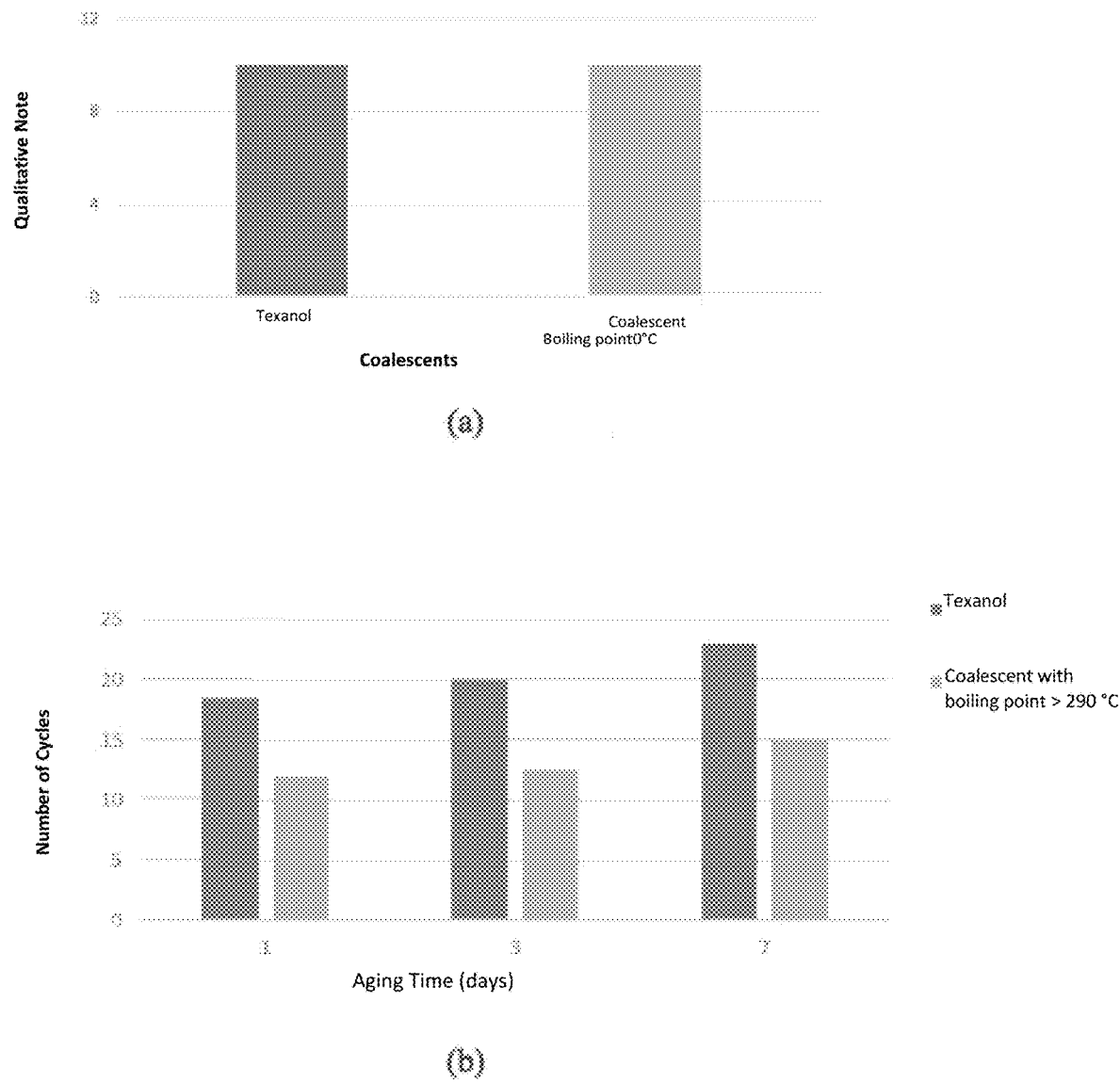
FIG. 9 shows two graphs: hardness evolution (a) and blocking resistance (b) of Premium matte paints containing Texanol® and low VOC coalescent.

The evolution of the paint hardness is essential so that the paint film has high resistance to the dirt grip. The resistance to blocking, which is the tendency of two surfaces to adhere permanently when placed in contact with one another under a certain pressure, as well as the dirt grip, has a certain dependence on the hardness of the paint films. However, direct measurement of hardness is more sensitive than blocking to the presence of coalescing retained in the paint film. FIGS. 9a and 9b show hardness evolution and blocking resistance of Texanol® containing paint films and a coalescer having a boiling point greater than 290° C.

The results shown in FIGS. 9a and 9b show that coalescing with a boiling point greater than 290° C. causes a decrease in the hardness of Premium matte hardness, however, the results of blocking resistance of Premium matte inks are similar.

Figure 10:
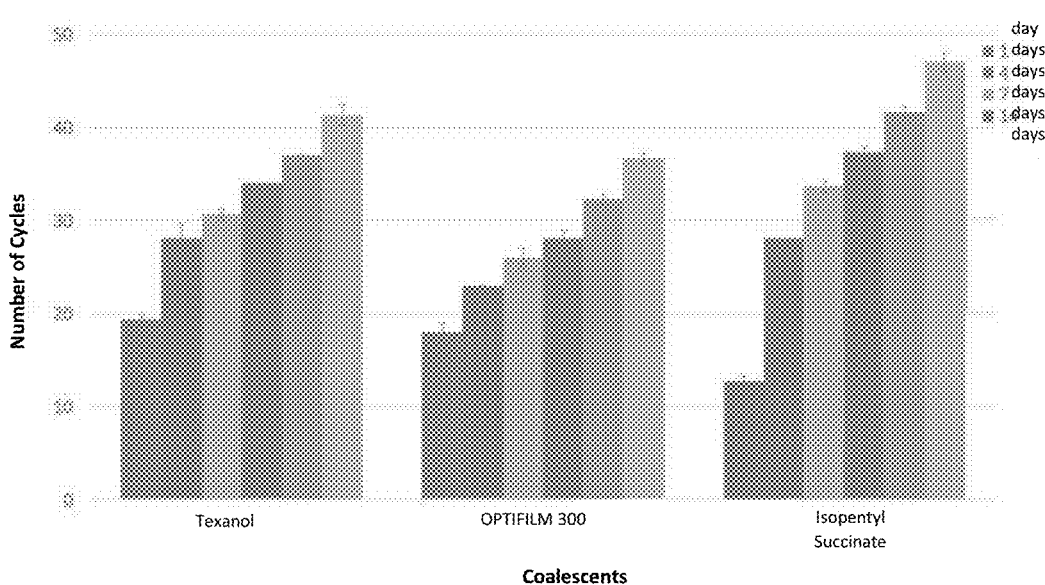
FIG. 10 shows a graph of the evolution of hardness of Premium matte paints containing 1.2% of different coalescents.

In FIG. 10 the hardness evolution data of Premium matte paint films containing Texanol™, OPTIFILM™ 300 and isopentyl succinate are shown.

The hardness results demonstrate that isopentyl succinate according to the present invention, despite having a boiling point higher than 280° C., can generate paint films with a higher hardness profile than OPTIFILM 300®, which has a similar boiling point. Surprisingly, isopentyl succinate can generate paint films with higher hardness evolution than Texanol® having a boiling point of 254° C. for film aging time of about 7 days.

Other inventions such as U.S. Pat. No. 3,399,158 to Distillers, U.S. Pat. No. 5,525,512 to BP Chemical Limited, US 2009/0194003 A1 to Rhodia, US 2012/0164467 A1 to Coatesville and US 2014/0243446 A1 to Myriant have already mentioned the use of diesters, in particular, derivatives of succinates in inks to solve specific problems. However, no invention has shown data that would allow diesters derived from succinic acid and other diesters having a boiling point greater than 280° C. to have a hardness evolution pattern higher than OPTIFILM 300® and Texanol® as demonstrated in the present invention.

Contrary to the diesters disclosed in patent documents US 2009/0194003 A1 and US 2009/0198002 A1, which come from diacid blends, for example, adipic acid, glutaric acid and succinic acid or from adipic acid, methyl glutarate and ethyl succinate and alcohols, among them isopentanol, in the present pure diacids, or at least without intentional addition of another diacid, are used to generate a diester with purity or diester content, preferably greater than 95%, for example the C5 alcohol succinate from the fusel oil.

Thus, the present invention does not utilize diesters of blends of adipic, glutaric and succinic acids and alcohols, adipic, glutaric and succinic acid blends and glycol ethers, plant acids and diols and 2-ethyl hexyl succinate.

Furthermore, due to the excellent plastification efficiency of the isopentyl succinate shown in Example 3, it is still possible to reduce its content in the ink formulation by maintaining a washability of the upper ink films compared to the Texanol® considered a reference market reference in washability.

Figure 11:
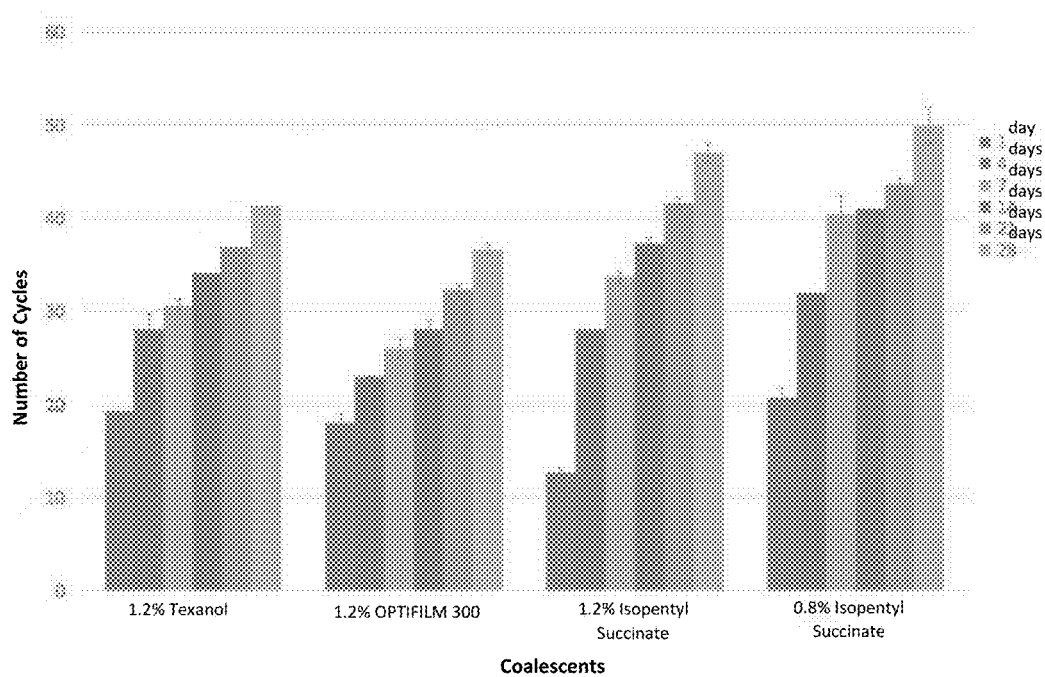
FIG. 11 shows a graph of the evolution of Premium matte hardness containing 1.2% of different coalescers and 0.8% of isopentyl succinate.

As shown in FIG. 11, the decrease in isopentyl succinate concentration of the ink formulation enables to further improve the hardness profile of the paint film over OPTIFILM 300™ and Texanol™. The paint films containing 0.8% isopentyl succinate presented higher hardness evolution than Texanol™ and OPTIFILM 300™ for all evaluated aging times.

Table 8 shows the blocking resistance data of U.S. patent application 2014/0243446 A1, which suggests a decrease in the blocking resistance of the paints containing the 2-ethylhexyl succinate compared to the paints containing OPTIFILM 300™. As previously mentioned, this behavior of 2-ethylhexyl succinate also favors the reduction of resistance to the dirt grip.

TABLE 8

Blocking resistance data set forth in U.S. Patent No. 2014/0243446 A1.

| Coalescent Code | Molecule/product | Blocking resistance ink formulation SG1 | Blocking resistance paint formulation SG2 |
|---|---|---|---|
| CAI | 2-Ethylhexyl succinate | 2.33 +/− 1.15 | 5.00 +/− 0.00 |
| CA3 | OPTIFILM 300 | 2.67 +/− 0.58 | 5.33 +/− 0.58 |

Such behavior of 2-ethylhexyl succinate reinforces that the present invention is not obvious. In fact, there is no low VOC coalescer having a boiling point greater than 280° C. which promotes an increase in the hardness of paint films containing conventional latexes such as the styrene-acrylic latex studied in the present invention which lacks functional groups that allow the self-reticulation.

Example 11: Comparative Evaluation of the Effect of the Coalescer of the Present Invention, from Patent Application US 2014/0243446 A1 and the Commonly Used in the Market in the Evolution of Hardness of Glossy Paint Formulation As mentioned earlier, the higher the polymer content in the formulation, the more critical is the effect of low VOC coalescents on the evolution of paint hardness. As a result, the effect of different low VOC coalescents on the evolution of satin paint formulation hardness, as described in Table 9, was evaluated. In particular, the effect of the isopentyl succinate according to the present invention and the 2-ethylhexyl succinate according to US 2014/0243446 A1 in the evolution of hardness of films of satin paints was evaluated comparatively.

TABLE 9

Satin paint formulations containing different coalescents.

| Components | % mass | % mass | % mass |
|---|---|---|---|
| Drinking Water | 6.5 | 6.5 | 6.5 |
| Sodium Nitrite | 0.0 | 0.0 | 0.0 |
| Sodium Tetrapirophosphate | 0.1 | 0.1 | 0.1 |
| Hydroxyethyl cellulose | 0.1 | 0.1 | 0.1 |
| Monoethylene Glycol | 1.2 | 1.2 | 1.2 |
| Amine | 0.1 | 0.1 | 0.1 |
| Dispersant | 0.3 | 0.3 | 0.3 |
| Humectant | 0.2 | 0.2 | 0.2 |
| Defoamer | 0.2 | 0.2 | 0.2 |
| Bactericide | 0.1 | 0.1 | 0.1 |
| Fungicide | 0.1 | 0.1 | 0.1 |
| Titanium dioxide | 15.0 | 15.0 | 15.0 |
| Precipitated Calcium Carbonate | 2.5 | 2.5 | 2.5 |
| CaCO natural #325 | 1.5 | 1.5 | 1.5 |
| Caulim - Aluminum Silicate | 6.0 | 6.0 | 6.0 |
| Drinking water | 31.74 | 31.74 | 31.74 |
| Defoamer | 0.25 | 0.25 | 0.25 |
| Amine | 0.15 | 0.15 | 0.15 |
| Acronal BS 700 | 31.00 | 31.00 | 31.00 |
| Texanol ™ | 1.5 | — | — |
| 2-ethylhexyl succinate | — | 1.5 | — |
| Isopentyl succinate | — | — | 1.5 |
| Rheology Modifier | 2.30 | 2.30 | 2.30 |
| Thickener Acrylic | 0.90 | 0.90 | 0.90 |
| Total | 100.00 | 100.00 | 100.00 |

In all the satin ink formulations, the coalescing content was maintained at 10 pcp.

Figure 12:
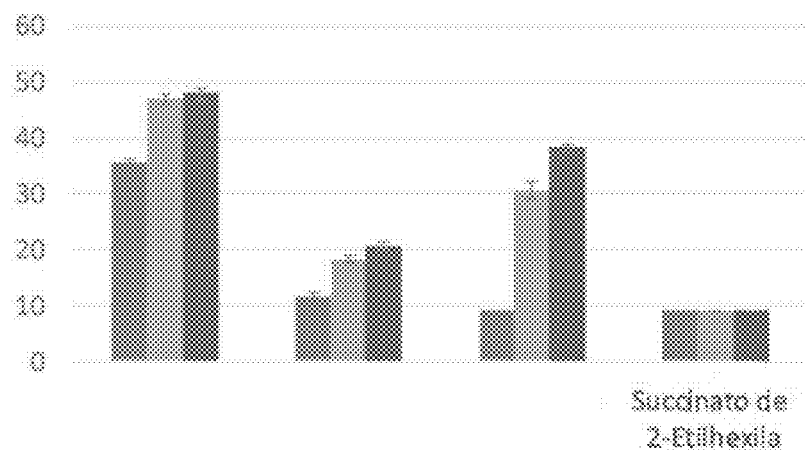
FIG. 12 shows a graph of hardness evolution of formulations of satin inks containing different coalescents and without coalescence (White).
Figure 13:
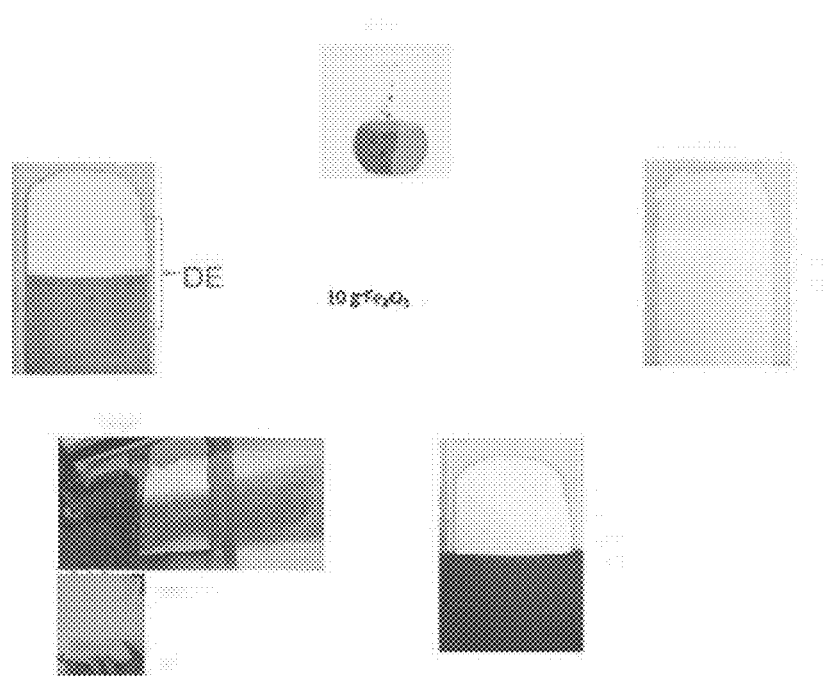
FIG. 13 presents a methodology for evaluating paint picking strength.

The hardness evolution graph of the formulations of paints evaluated is shown in FIG. 12.

The hardness evolution patterns shown in FIG. 12 demonstrate that the isopentyl succinate according to the present invention favors the evolution of hardness of the paint film, exhibiting a hardness evolution greater than the Texanol® for aging time around 7 days, whereas 2-ethylhexyl succinate according to US 2014/0243446 A1 does not favor the evolution of hardness, keeping the film with low hardness even for drying time of more than 7 days. In fact, 2-ethylhexyl succinate produced a satin paint formulation having the same hardness evolution pattern observed for the low VOC coalescing and boiling point higher than 290° C. shown in FIG. 9a.

Example 12: Evaluation of Semi-Gloss Ink Dirt Grip

Table 11 shows the semi-gloss paint formulation, PVC of 30%, used in the evaluation of resistance to the dirt handle.

The internal methodology of assessing resistance to dirt grip consists of:
a. Prepare the standard dirt as described in Table 12.
b. Prepare an ink film with a thickness of 150 μm and dry at room temperature for a period of 7-80 days.
c. Apply the standard dirt with a thickness of 20 μm on half the paint film with a thickness of 150 pm previously dried and dry for 24 h at room temperature.
d. Remove dirt by performing 4 wash cycles using water and a Scotch Brite™ type sponge, rinse in running water for 1 minute and dry for 24 hours at room temperature.
e. Determine the color difference between the region that received the dirt and the region that did not receive the dirt.

Figure 14:
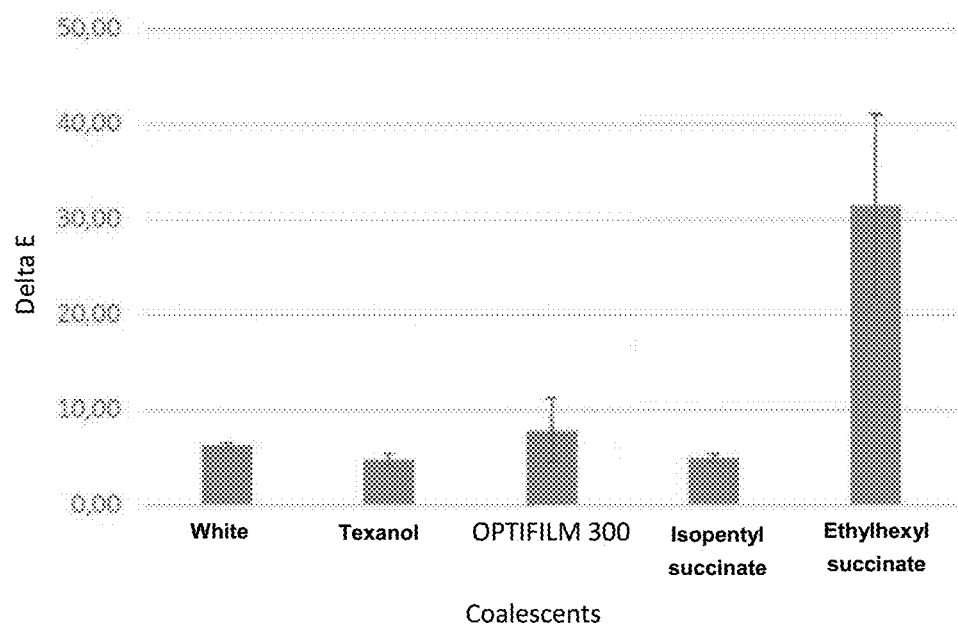
FIG. 14 shows delta E results of semi-gloss inks formulated with different coalescents.

The delta E results of semi-gloss paint films containing different dry coalescers for 82 days are shown in FIG. 14. The resistance to the dirt grip is inversely proportional to the Delta E.

TABLE 11

Satin ink formulations containing different coalescents.

| Components | % | % mass | % mass | % mass |
|---|---|---|---|---|
| Drinking Water | 9.25 | 9.25 | 9.25 | 9.25 |
| Sodium Nitrite | 0.03 | 0.03 | 0.03 | 0.03 |
| Sodium Tetrapirophosphate | 0.05 | 0.05 | 0.05 | 0.05 |
| Hydroxyethyl cellulose | 0.15 | 0.15 | 0.15 | 0.15 |
| Monoethylene Glycol | 1.50 | 1.50 | 1.50 | 1.50 |
| Amine | 0.05 | 0.05 | 0.05 | 0.05 |
| Dispersant | 0.35 | 0.35 | 0.35 | 0.35 |
| Humectant | 0.15 | | 0.15 | 0.15 |
| Defoamer | 0.10 | 0.10 | 0.10 | 0.10 |
| Bactericide | 0.15 | 0.15 | 0.15 | 0.15 |
| Fungicide | 0.05 | 0.05 | 0.05 | 0.05 |
| Titanium dioxide | 21.50 | 21.50 | 21.50 | 21.50 |
| Caulim - Aluminum Silicate | 3.50 | 3.50 | 3.50 | 3.50 |
| Precipitated Calcium | 1.50 | 1.50 | 1.50 | 1.50 |
| Acronal BS 700 | 35.00 | 35.00 | 35.00 | 35.00 |
| Defoamer | 0.25 | 0.25 | 0.25 | 0.25 |
| Amine | 0.40 | 0.40 | 0.40 | 0.40 |
| Texanol | 2.00 | — | — | — |
| OPTIFILM 300 ™ | — | 2.00 | — | — |
| Succinate of 2-ethylhexyl | — | — | 2.00 | — |
| Isopentyl succinate | — | — | — | 2.00 |
| Rheology Modifier | 2.30 | 2.30 | 2.30 | 2.30 |
| Thickener Acrylic | 0.30 | 0.30 | 0.30 | 0.30 |
| Drinking Water | 21.42 | 21.42 | 21.42 | 21.42 |
| Total | 100.00 | 100.00 | 100.00 | 100.00 |

TABLE 12

Standard dirt formulation

| Components | Mass (g) | % Mass |
|---|---|---|
| Drinking Water | 200.0 | 66.6 |
| Dispersant | 0.5 | 0.2 |
| Red iron oxide | 50. | 16.6 |
| Yellow iron oxide | 40. | 13.3 |
| Black iron oxide | 10.0 | 3.3 |
| Amine | 300.5 | 100.0 |

The Delta E results shown in FIG. 14 indicate that the coalescer of the present invention with a boiling point of 282° C. presents excellent resistance to dirt, similar to Texanol with a boiling point of 254° C., and superior to OPTIFILM 300™ with boiling point of 281° C. The mean delta E difference between coalescent-containing paints of the present invention and OPTIFILM 300™ is in the order of 3. Typically, an increase in dirt resistance associated with delta E decrease in the order of 1 is considered relevant from the literature.

It should be noted that the 2-ethylhexyl succinate protected in US 2014/0243446 AI has the lowest resistance to the dirt. This result of low resistance to the dirt is consistent with the hardness results described in Table 8.

The invention claimed is:

1. A water-based coating composition with a low content of volatile organic compounds (VOC) and high resistance to dirt, said coating composition comprising:
   dispersions of polymers in water or latex or latexes or polymers in solution, wherein the polymers have a Tg of less than 55° C.; and
   coalescents with the following structure:

R1-B-A-B—R2, wherein:
   R1 and R2 may be the same or different, R1 and R2 are saturated C5-C7 or C5-C7 alkoxylated derivatives,
   B is O—C═O, wherein the carbon of the ester group is bonded to the carbon of the group A,
   A is $(CH_2)_n$ wherein n=1 to 8;
   wherein:
   the coalescents are derived from diesters and come from reactions of only a single diacid with alcohols, wherein diesters of adipic, glutaric and succinic acid blends and alcohols, adipic, glutaric and succinic acid blends and glycol ethers, diacids and diols from vegetable sources and 2-ethyl hexyl succinate are excluded,
   the coalescents have a purity of 80 to 99.9% by weight,
   the coalescents have a molecular weight ranging from 240 to 320 units of atomic mass, and a boiling point of greater than 280° C.

2. The coating composition according to claim 1, wherein the coalescents are derived from succinic acid and C5 alcohol from fusel oil.

3. The coating composition according to claim 2, wherein the C5 alcohol from the fusel oil has 75-80% by weight of 3-methyl-butanol and 20-25% by weight of 2-methyl-butanol.

4. The coating composition according to claim 3, wherein the C5 alcohol from the fusel oil has 80% by weight 3-methylbutanol and 20% by weight 2-methylbutanol.

5. The coating composition according to claim 1, wherein the polymer dispersions or latexes are selected from the group consisting of styrene-butyl acrylate, styrene-butyl acrylate-acrylic acid, styrene-butyl acrylate-methacrylic acid, styrene-butadiene, styrene-butadiene-acrylic acid, styrene-butadiene-methacrylic acid, polyacrylates, polyacrylates-acrylic acid, polyacrylates-methacrylic acid, polyacrylates-carboxylic acids, vinyl acetate-butyl acrylate, vinyl acetate-ethylene, polyvinyl acetate, alkyds, epoxy resin derivatives, polyesters, polyurethane, melamine-polyurethane, and latexes mixtures.

6. The coating composition according to claim 1, wherein the concentration of coalescents varies from 0.1 to 50% by weight in relation to the content of the polymer present in the composition.

7. The coating composition according to claim 6, wherein the coalescent concentration ranges from 0.5 to 35% by weight relative to the polymer content present in the composition.

8. The coating composition according to claim 7, wherein the coalescent concentration ranges from 1 to 12% by weight relative to the polymer content present in the composition.

9. The coating composition according to claim 1, wherein the coalescent is isopentyl succinate.

10. The coating composition according to claim 1, wherein the polymers have a Tg of less than 40° C.

11. The coating composition according to claim 1, wherein the coalescents have a purity of 95 to 99.9% by weight.

12. A paint, comprising the water-based coating composition according to claim 1.

13. A printing ink, comprising the water-based coating composition according to claim 1.

14. A toner, comprising the water-based coating composition according to claim 1.

15. An adhesive, comprising the water-based coating composition according to claim 1.

16. A sealant, comprising the water-based coating composition according to claim 1.

17. A waterproofing agent, comprising the water-based coating composition according to claim 1.

18. A glove, comprising the water-based coating composition according to claim 1.

19. A carpet, comprising the water-based coating composition according to claim 1.

* * * * *